United States Patent
Kaila et al.

(10) Patent No.: US 9,479,582 B2
(45) Date of Patent: *Oct. 25, 2016

(54) METHOD AND SYSTEM FOR MANAGEMENT OF SYNCHRONIZATION OF A MOBILE ELECTRONIC DEVICE

(71) Applicant: BlackBerry Limited, Waterloo (CA)

(72) Inventors: Ashish Kaila, Etobicoke (CA); Raymond Lee Canton, Ottawa (CA); Roy Robert George Wilson, Ottawa (CA)

(73) Assignee: BLACKBERRY LIMITED, Waterloo (CA)

(*) Notice: Subject to any disclaimer, the term of this patent is extended or adjusted under 35 U.S.C. 154(b) by 322 days.

This patent is subject to a terminal disclaimer.

(21) Appl. No.: 14/169,591

(22) Filed: Jan. 31, 2014

(65) Prior Publication Data

US 2014/0149550 A1 May 29, 2014

Related U.S. Application Data

(63) Continuation of application No. 12/954,818, filed on Nov. 26, 2010, now Pat. No. 8,645,574.

(51) Int. Cl.
*G06F 15/16* (2006.01)
*H04L 29/08* (2006.01)
*G06F 17/30* (2006.01)

(52) U.S. Cl.
CPC ..... *H04L 67/1095* (2013.01); *G06F 17/30578* (2013.01)

(58) Field of Classification Search
CPC . H04L 67/1095; H04L 67/322; H04L 47/10; G06F 17/30578; G06F 15/16; G06F 17/30749; G06F 17/30174
See application file for complete search history.

(56) References Cited

U.S. PATENT DOCUMENTS

| | | | |
|---|---|---|---|
| 7,768,234 B2 | 8/2010 | Janik et al. | |
| 7,890,646 B2 | 2/2011 | Khosravy et al. | |
| 8,019,863 B2* | 9/2011 | Jeide | H04L 67/1095 709/223 |
| 2004/0003302 A1* | 1/2004 | Marshall | H04L 67/1095 713/300 |
| 2005/0033863 A1 | 2/2005 | Tosey et al. | |
| 2005/0258806 A1* | 11/2005 | Janik | G06F 17/30749 320/155 |

(Continued)

FOREIGN PATENT DOCUMENTS

EP 1942423 A1 7/2008

OTHER PUBLICATIONS

Pinola, Melanie, "How to Sync Your Data Across Multiple Devices," About.com Guide, accessed on Aug. 10, 2010 at http://mobileoffice.about.com/od/softwarewebapps/a/sync-multiple-devices.htm.

(Continued)

*Primary Examiner* — Ario Etienne
*Assistant Examiner* — Kidest Mendaye
(74) *Attorney, Agent, or Firm* — Perry + Currier

(57) ABSTRACT

The present technology provides a method, system and computer program product for managing the synchronization of a mobile electronic device, wherein management and adjustment of the synchronization process can be provided at least in part on a session by session basis. The synchronization process may be configurable via a user interface. Aspects of the user interface, such as prompts or degree of user configurability, may be adjusted depending on one or more factors, such as link effective speed or expected synchronization time.

18 Claims, 11 Drawing Sheets

(56) References Cited

U.S. PATENT DOCUMENTS

| | | | | |
|---|---|---|---|---|
| 2007/0255854 A1* | 11/2007 | Khosravy | ........... | H04L 67/1095 709/248 |
| 2008/0049714 A1* | 2/2008 | Commarford | ....... | G06Q 20/105 370/350 |
| 2008/0168526 A1* | 7/2008 | Robbin | ............. | G06F 17/30174 725/139 |
| 2010/0114846 A1 | 5/2010 | LaChapelle et al. | | |
| 2010/0241759 A1* | 9/2010 | Smith | ..................... | H04L 47/10 709/233 |

OTHER PUBLICATIONS

Pinola, Melanie, "Top 7 File Syncing Apps," About.com Guide, accessed on Aug. 10, 2010 at http://mobileoffce.about.com/od/softwarewebapps/tp/top-file-syncing-apps.htm.

Murphy, David, "Synchronize Your Data With Multiple PCs, Macs, and Mobile Devices," PC World Business Center, accessed on Aug. 10, 2010 at http://www.pcworld.com/businesscenter/article/174513/synchronize_your_data_with_multiple_pcs_macs_and_mobile_devices.html.

"Windows Mobile Device Center," Wikipedia online encyclopedia, accessed on Aug. 12, 2010 at http://en.wikipedia.org/wiki/Windows_Mobile_Device_Center.

"Allway Sync: Free File Synchronization, Backup, Data Replication, PC Sync Software, Feeware, File Sync, Data Synchronization Software," webpage accessed on Nov. 24, 2010 at http://www.allwaysync.com/.

"Sync any folder with DropBox in one click," Technospot.net, accessed on Nov. 24, 2010 at http://www.technospot.net/blogs/sync-any-folder-with-dropbox-in-one-click/.

Sprint Mobile Sync User Guide, 2008, available at www.sprint.com/cdma/assets/pdfs/services_guides/organize/sprint_mobile_sync_ug.pdf.

SugarSync, webpage accessed on Aug. 10, 2010 at https//www.sugarsync.com/.

GoodSync, webpage accessed on Aug. 10, 2010 at http://www.goodsync.com/.

* cited by examiner

METHOD AND SYSTEM FOR MANAGEMENT OF SYNCHRONIZATION OF A MOBILE ELECTRONIC DEVICE

CROSS-REFERENCE TO RELATED APPLICATIONS

This application is a continuation application of U.S. patent application Ser. No. 12/954,818 filed on Nov. 26, 2010, which claims priority to U.S. Provisional Patent Application No. 61/369,844. The forgoing application is incorporated by reference herein in its entirety.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

TECHNICAL FIELD

The present disclosure relates generally to mobile electronic devices and, in particular, to techniques for managing the synchronization of a mobile electronic device.

BACKGROUND

Mobile electronic devices such as cellular telephones, handheld PDAs, and the like, are typically configured for synchronization with a computing device, thereby enabling for example the backup or updating or both, of the information contained on the mobile electronic device or the computing device or both.

Currently, the synchronization of a mobile electronic device and a computing device typically occurs upon the operative interconnection of these devices. The synchronization process is typically defined by a series of predetermined parameters, therefore limiting the flexibility of the synchronization process.

Therefore there is a need for a new method and system for synchronization of a mobile electronic device that overcomes one or more problems in the art.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1A:
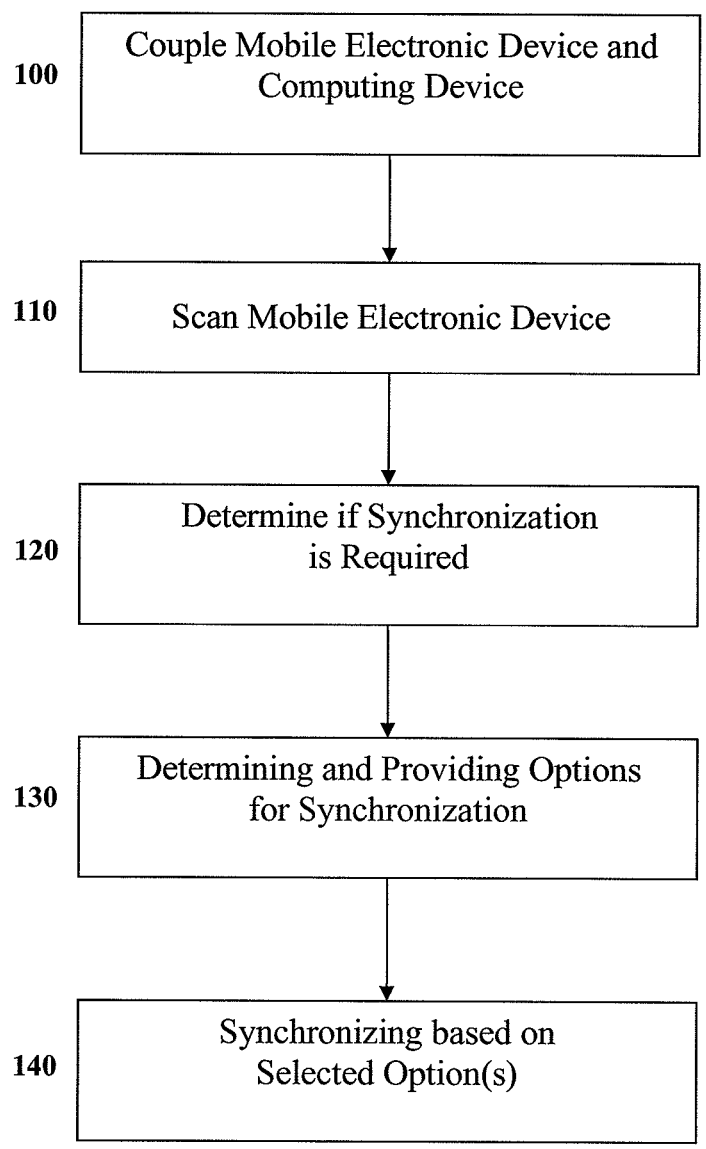
FIG. 1A illustrates a method for synchronizing a mobile electronic device with a computing device according to embodiments of the present technology.

The present technology generally provides a method, system, and computer program product for management of synchronization of a mobile electronic device, wherein management of the synchronization process can be provided on a case by case basis.

Accordingly, an aspect of the present technology provides a method of synchronizing a mobile electronic device with a computing device. The method comprises operatively coupling the mobile electronic device with a synchronization module at least in part operative on the computing device. The method further comprises scanning the mobile electronic device by the synchronization module, and subsequently determining if one or more pieces of data require synchronization. The method further comprises determining and providing a user with one or more options for selection, wherein each option defines a synchronizing sequence. In addition the method comprises synchronizing the mobile electronic device with the computing device based at least in part on the synchronizing sequence that was selected by the user.

Another aspect of the present technology provides a computer program product comprising code adapted to perform acts associated with the foregoing method when the code is loaded into memory and executed on a processor of a computing device.

Yet another aspect of the present technology provides a system configured to synchronize a mobile electronic device with a computing device. The system comprises a synchronization module at least in part operative on the computing device. The synchronization module is configured to scan the mobile electronic device and determine if one or more pieces of data require synchronization. The synchronization module is further configured to determine one or more options, wherein each option defines a synchronizing sequence. The system further comprises an output device operatively coupled to the synchronization module, wherein the output device is configured to present the one or more options to a user for selection. In addition, the system includes an input device operatively coupled to the synchronization module, wherein the input device is configured to receive an input from the user, wherein the input is indicative of the selected synchronizing sequence. Based on the selected synchronizing sequence, the synchronizing module is configured to perform the synchronization between the mobile electronic device and the computing device.

A mobile electronic device and a computing device may be capable of being operatively interconnected via one or more wired or wireless communication links. Wireless communication links may include Bluetooth™, IEEE 802.11 or Wi-Fi™, Wireless USB, ZigBee™, Infrared links, or the like, or other wireless communication links as would be readily understood by a worker skilled in the art. Wired communication links may include USB™, Firewire™, Ethernet™, or the like, or other serial or parallel wired communication links as would be readily understood by a worker skilled in the art. Each type of link is associated with parameters such as protocol type, communication overhead, link reliability, link uptime, bandwidth, delay, bit error rate, block error rate, signal-to-noise ratio, averages, ranges, variances, aggregates or estimates of such parameters, and the like. Such parameters may further be range dependent, particularly for wireless links. A data link may be generally classified by the speed at which communication operations such as synchronization can occur. Effective speed may relate to the number of data units per second that can be effectively synchronized after overhead operations such as connection management, error correction, and the like, are accounted for, and given parameters associated with the link.

According to embodiments of the present technology, aspects of the synchronization may vary based on the type of communication link between the computing device and the mobile electronic device, link parameters such those described above, link effective speed, and the like. If the computing device and the mobile electronic device are coupled via plural links, aspects of the synchronization may vary based on the types of links, aggregates of parameters corresponding to the individual links, a total effective speed when utilizing the plural links, or a combination thereof.

For example, in some embodiments, user prompting, options related to synchronization, or both, may be varied based on type or types of communication links between computing device and mobile electronic device, link parameters, link effective speed, or a combination thereof. For example, if the operative coupling between the computing device and the mobile electronic device is determined to have at least a predetermined effective speed, or synchronization is expected to take less than a predetermined threshold amount of time, then the synchronization may occur automatically or a reduced number of options, relative to slower couplings or longer synchronization times, may be presented via a user interface for configuring the synchronization. This may be the case for example when the communication link is a high-speed Ethernet connection or USB™ 2.0 connection. For example, such an embodiment may substantially reduce the level of user input when synchronization is expected to be completed in a relatively short time regardless of prioritization. Thus, unnecessary or superfluous user input to select data, prioritize data, or both, to be synchronized may be avoided in some embodiments, based on communication link capabilities.

Similarly, in some embodiments, when the operative interconnection between computing device and mobile electronic device is classified as "slow," for example in terms of link type, effective speed, expected synchronization time, or the like, the level of user prompting, user input, or both, may be increased relative to when the operative interconnection is classified as "fast." For example, when the estimated time required for total synchronization exceeds a predetermined threshold, the user may be presented with an extended list of options for choosing data to synchronize and for prioritizing which data to synchronize first, or both.

In some embodiments, if the operative interconnection between computing device and mobile electronic device is determined to be sufficiently slow or unreliable, a warning may be issued advising the user of the link quality.

In some embodiments, users may be capable of overriding automatic operations. Alternatively, a "synchronization assistant" may be configured to make recommendations to a user, instead of automatically adjusting the information and options available to the user.

In some embodiments, other aspects of the synchronization may be adjusted based on speed or other parameters related to the operative interconnection between computing device and mobile electronic device. For example, aspects of data files to be synchronized, such resolution, quality, compression rate, or the like, may be automatically adjusted to accommodate slower connections or take advantage of faster connections, or an option may be presented to the user, possibly along with an appropriate recommendation, for adjusting such aspects. These options may be particularly suited for adjusting data files such as pictures, video, audio and multimedia files.

In some embodiments, an option may be presented for a user to specify a time budget for synchronization. The time budget may be saved in memory of the computing device, the mobile electronic device, or a combination thereof, and applied to subsequent synchronizations, or it may be specified at each synchronization. The time budget may be compared with one or more expected synchronization times, and a level of user prompting, user options, or both, may be presented based on the comparison. For example, if synchronization of all files of predetermined types can be completed within the time budget, then synchronization may proceed automatically. As the expected time for synchronization increases beyond the time budget, more options, prompts, or a combination thereof, may be presented, so that a user can prioritize which files to synchronize, and the order or prioritization of files to be synchronized.

In some embodiments, expected amounts of time available for synchronization, or time related to user-specified time budgets, or both, may depend at least in part on the type or types of operative couplings between computing device and mobile electronic device. For example, if the operative coupling comprises a medium-range wireless link such as Wi-Fi™, the expected amount of time available for synchronization may be greater than if the operative coupling is only a short-range wireless link such as Bluetooth™, since the device can roam further under the medium-range link while maintaining connectivity to support synchronization. As another example, if the operative coupling comprises a wired link which also charges the mobile electronic device, such as USB™, and the battery level of the mobile electronic device is below a predetermined threshold, then the expected amount of time available for synchronization may be larger than if another, more temporary link is used, if it is deemed likely that the mobile electronic device will be connected for an extended period of time to facilitate charging.

According to embodiments of the present technology, the selected synchronization sequence is indicative of the one or more pieces of data that require synchronization based on user selection. The selected one or more pieces of data defined by the selected option, can be defined by varying levels of specificity. For example, the selected one or more pieces of data defined by the selected option can be all unsynchronized personal information management (PIM) data, all unsynchronized calendar data, or unsynchronized calendar data for a specific month, week or year. As a further example, the selected one or more pieces of data defined by the selected option, can be all unsynchronized multi-media data, or all music data, or selected specific songs or selected specific picture or combinations thereof. Accordingly, as the user is able to select the amount of unsynchronized data that is to be synchronized, the user is provided with a level of control over the time it takes for synchronization.

According to embodiments of the present technology, the method, system and computer program product for user selective synchronization of a mobile electronic device with a computing device are configured to operate independent of one or more predetermined synchronization processes that are pre-enabled on the mobile device or computing device or both. The predetermined synchronization processes can be, for example based on setup parameters of mobile electronic device in association with the computing device. In addition, the performance of the selected synchronization process can done such that the one or more predetermined synchronization processes are unchanged.

As discussed herein, a computing device is a device comprising a microprocessor (or simply a "processor") which interacts with memory in the form of RAM, ROM, Flash, EPROM, EEPROM or other memory format to enable a variety of device functions and to execute an operating system for running software applications loaded on the computing device. In terms of input/output devices or user interfaces (UI's), a computing device may include a display (e.g. a LCD screen), touch screen, a thumbwheel, a trackball, a keyboard, a USB or serial port for connecting to peripheral equipment among others. Examples of a computing device can include a desktop computer, server, laptop, netbook, tablet, smart phone, personal digital assistance or other computing device as would be readily understood. Furthermore, a mobile electronic device is a computing device which is configured for mobility mobile, for example a laptop, netbook, tablet, smart phone, personal digital assistance or other computing device configured for mobility as would be readily understood. In addition, a wireless communication device is a device having appropriate communication capabilities, such as voice communication capabilities, data communication capabilities, or a combination thereof. The term "wireless communication device", for the purposes of this specification, shall include any wireless handheld, smart phone, PDA, tablet, laptop, netbook, or other communications device that is capable of transmission and reception of data via a wireless communication medium such as radio.

The details and particulars of these aspects of the technology will now be described below, by way of example, with reference to the attached drawings.

FIG. 1A illustrates a method for synchronizing a mobile electronic device with a computing device according to embodiments of the present technology. Initially, the mobile electronic device is operatively coupled 100 to the computing device, for example by establishing a wired or wireless communication link therebetween. A synchronization module is either operative prior to this coupling or initiated upon or subsequent to coupling, and the synchronization module initially scans 110 the mobile electronic device or the computing device or both. The scanning process can be used in order to evaluate or determine if one or more pieces of data are not synchronized with respect to the mobile electronic device and the computing device. That is, the scanning process determines 120 whether a synchronization operation is required. Upon this determination the synchronization module determines 130 one or more options for synchronization, wherein each of the one or more options is indicative of a synchronization sequence. For example, if a plurality of pieces of data require synchronization, the synchronization module can determine one or more options for synchronization, wherein each of the options enables the synchronization of particular pieces of data, for example, only calendar data, or only address data, or only music data or only one or more other data types or combinations of data types. These one or more options are subsequently provided to the user for selection. Upon selection of an option, the synchronization module subsequently performs 140 the synchronization process which is associated with the selected option. Selection of an option may comprise one or more input operations, for example to click one or more virtual buttons or select one or more checkboxes. Selection of an option may possibly comprise detailed customization of the option, for example by manipulating drop down or hierarchical menus, rather than selecting an option from a simple list.

Figure 1B:
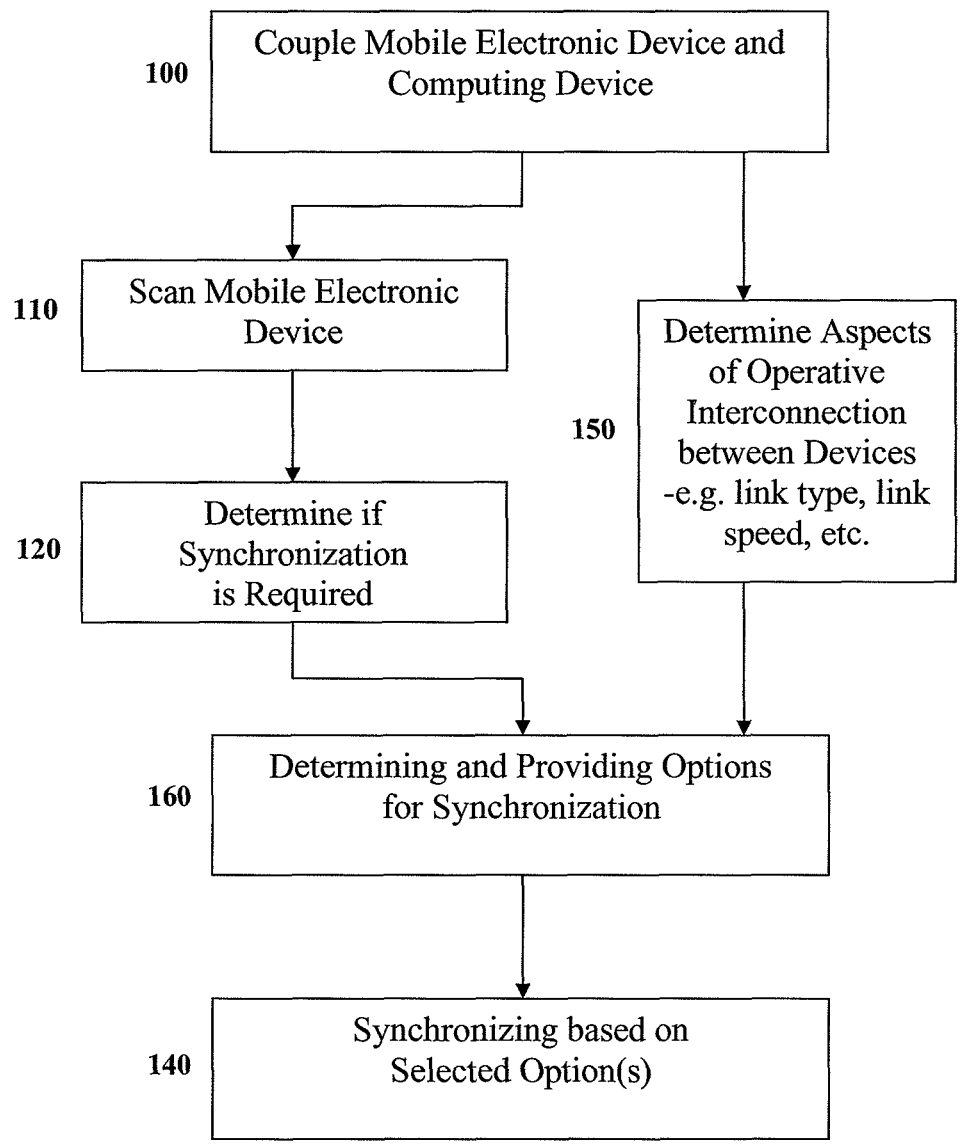
FIG. 1B illustrates another method for synchronizing a mobile electronic device with a computing device according to embodiments of the present technology.

FIG. 1B illustrates another method for synchronizing a mobile electronic device with a computing device according to embodiments of the present technology. As with the method of FIG. 1A, the mobile electronic device is operatively coupled 100 to the computing device, the synchronization module initially scans 110 the mobile electronic device or the computing device or both and determines 120 whether synchronization is required. Additionally, after the mobile electronic device is operatively coupled 100 to the computing device, the synchronization module determines 150 one or more aspects of the operative interconnection between computing device and mobile electronic device, such as link type, link parameters, and link effective speed. Based on the above determinations 120 and 150, the synchronization module determines 160 one or more options for synchronization, which are subsequently provided to the user for selection. For example, more options for synchronization may be presented when there is a large amount of data to synchronize, a slow link effective speed, or a combination thereof, and fewer options may be presented when there is a small amount of data to synchronize, a fast link effective speed, or a combination thereof, thereby prompting a user for prioritization of synchronization tasks only as much as is necessary. As another example, the default option or options may be adjusted based on the determinations 120 and 150. Upon selection of an option, the synchronization module subsequently performs 140 the synchronization process which is associated with the selected option.

According to embodiments of the present technology, by providing a user with options of what to synchronize between the mobile electronic device and the computing device, a user is provided with the ability to actively control the synchronization process on a case by case basis.

In some embodiments of the present technology, the synchronization module is configured to scan third party software applications for one or more pieces of data associated therewith that require synchronization. For example, if the mobile electronic device comprises an iTunes™ application, the synchronization module can be configured to identify one or more of the songs that require synchronization.

Figure 2:
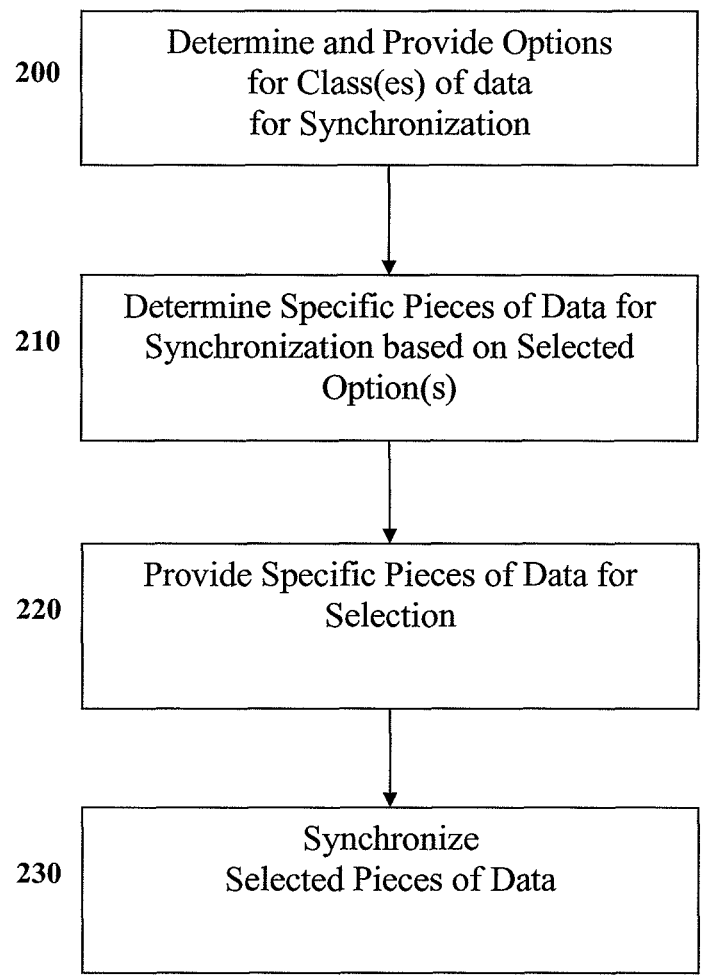
FIG. 2 illustrates a portion of a method for synchronizing a mobile electronic device with a computing device, according to embodiments of the present technology.

In some embodiments, the determining and providing options for selection process can be an iterative process. For example, upon an initial selection of a general option by a user, the synchronization module can perform a subsequent discovery operation regarding the one or more pieces of data that require synchronization. For example, and as illustrated in FIG. 2, a first scan by the synchronization module provides for the determination of one or more classes of data that require synchronization 200. For example the synchronization module may determine that there are one or more pieces of PIM data or one or more pieces of music data or one or more pieces of video data, or the like or combinations thereof, that require synchronization. In this case, the synchronization module provides the user with options based on these identified classes. Upon selection of an option, the synchronization module performs a further scan in order to determine 210 what particular pieces of data, that are in the one or more classes defined by the selected option, require synchronization. The synchronization module subsequently determines and provides further options for selection wherein these further options may be indicative of the specific pieces of data that have been determined 220. For example, if the user has selected to synchronize photo data, the synchronization module determines which photos are not synchronized, and presents the unsynchronized photos to the user for selection. Based upon the further option selected, the synchronization module would synchronize 230 the pieces of data represented by the further option selected. In this manner, and for the above example relating to photo data, a user is presented with the capability to select particular photos which they wish to synchronize.

In some embodiments of the present technology, the synchronization module performs the further scan to determine what particular pieces of data require synchronization prior to user selection of one of the options based on these identified classes. In these embodiments, the further scan can be performed by the synchronization module in the background. The synchronization module subsequently determines and provides further options for selection wherein these further options may be indicative of the specific pieces of data that have been determined. Based upon the further option selected, the synchronization module would synchronize the pieces of data represented by the further option selected. By performing the further scan in the background, upon selection of the a further option by a user, the details of the specific pieces of data may be readily available, as this selection of a further option may not initiate the further scan.

In some embodiments, with respect to the further options which represent specific pieces of data, each of these pieces of data may be presented as being selected for synchronization, wherein the user is provided with the option of de-selecting particular pieces of data for synchronization.

According to embodiments of the present technology, by performing an iterative process for the selection of the one or more pieces of data for synchronization, the synchronization module can perform the selected tasks in a more efficient manner. For example, if initially the synchronization module determined the specifics of all or predetermined groups of the pieces of data to be synchronized, time and energy may have been used substantially unnecessarily should the user only select to synchronize the photo data. In some embodiments of the present technology, there can be a plurality of iterations leading to the identification of the one or more pieces of data to be synchronized.

In some embodiments of the present technology, upon scanning and determination of the one or more pieces of data, the synchronization module can save at least some of the details relating to the one or more pieces of data that are not selected for synchronization during a particular synchronization operation or session. The synchronization module can cache or save some or all this information on the mobile electronic device or the computing device or both. In this manner, the synchronization module can potentially speed up future synchronization operations or sessions based on pre-discovered information relating to the one or more pieces of information for synchronization.

In some embodiments, synchronization may proceed automatically as items are selected for synchronization. This may accelerate synchronization operations since synchronization can begin even before the user has selected all data to be synchronized.

According to embodiments of the present technology, during the scanning and determination process, a sequence of steps can include: creating a sync task to execute synchronization operations for particular type of data, for example photos; providing metadata for the sync task; enabling or disabling error handling for the sync task; enabling or disabling sync task interruption or cancellation capabilities; and adding the one or more sync tasks to an event list. During the synchronization process, the event list can be referenced by the synchronization module for the subsequent sync task to be performed. The event list may be a queue of sync tasks, with tasks toward the front of the queue executed before tasks toward the back of the queue. In some embodiments, order of tasks in the queue may be adjusted by the user. For example the specific order of tasks may be set, or tasks may be assigned priority levels, the event list then sorted so that higher priority tasks appear before lower priority tasks in the queue.

According to embodiments of the present technology, during the synchronization of the one or more selected pieces of data, the synchronization module can provide the user with an indication of the progress of the synchronization sequence. For example, the indication can be representative of the time remaining, number of pieces of data remaining to be synchronized or the like. According to some embodiments of the present technology, the indication is data type innocuous, and thus is not representative of the specific type of data left to be synchronized. In some embodiments, the indication may be representative of a range of times, for example from an estimated minimum time remaining to an estimated maximum time remaining, optionally with further indication of an expected time remaining. In some embodiments, the indication may be representative of time remaining for different types of tasks, for example time remaining to complete high priority synchronization tasks, medium priority synchronization tasks, and low priority synchronization tasks.

In some embodiments, an option may be provided to schedule an interruption of synchronization. For example, after synchronization has begun, a user may input that synchronization is to be interrupted after completion of the current task, after completion of tasks of a priority level or priority type corresponding to tasks currently being performed, or the like.

In some embodiments of the present technology, the indication of the progress of the synchronization sequence is presented to a user with details, for example what type of data remains to be synchronized or what has been completed or both. For example, the indication may define how many photos are still to be synchronized. According to some embodiments, the indication of progress is further configured to provide a user with the ability to prioritize synchronization sequences of specific pieces of data or groups of pieces of data.

According to embodiments of the present technology, upon initial operative coupling of the mobile electronic device and the computing device, the synchronization module performs a mobile electronic device discovery process, wherein identification parameters of said mobile electronic device are captured by the synchronization module for subsequent presentation to a user, thereby enabling a user to verify that the correct mobile electronic device is to be synchronized. In some embodiments, the synchronization module captures a copy of the home screen or wallpaper of the operatively coupled mobile electronic device. The synchronization module can subsequently present this captured home screen or wallpaper to the user to enable a visual confirmation of the mobile device which is operatively coupled for synchronization. In some embodiments, the discovery process may further determine the type of communication link or links between mobile electronic device and computing device, or the speed, effective speed, or available bandwidth associated with the communication link or links, or a combination thereof, or the like. Link speed may be determined from factors such as link bandwidth, delay, and error rate, for example.

Acts associated with the method described herein can be implemented as coded instructions in a computer program product. In other words, the computer program product is a computer-readable medium upon which software code is recorded to execute the method when the computer program product is loaded into memory and executed on the microprocessor of a computing device.

Acts associated with the method described herein can be implemented as coded instructions in plural computer program products. For example, a first portion of the method may be performed using one computing device, and a second portion of the method may be performed using another computing device, server, mobile electronic device or the like. In this case, each computer program product is a computer-readable medium upon which software code is recorded to execute appropriate portions of the method when a computer program product is loaded into memory and executed on the microprocessor of a computing device.

At least portions of the method described herein can be implemented on a wireless communications device having appropriate communication capabilities, such as voice communication capabilities, data communication capabilities, or a combination thereof. The term "wireless communication device", for the purposes of this specification, shall include any wireless handheld, smart phone, PDA, tablet, laptop, netbook, or other communications device that is capable of transmission and reception of data via a wireless communication medium such as radio.

Figure 3:
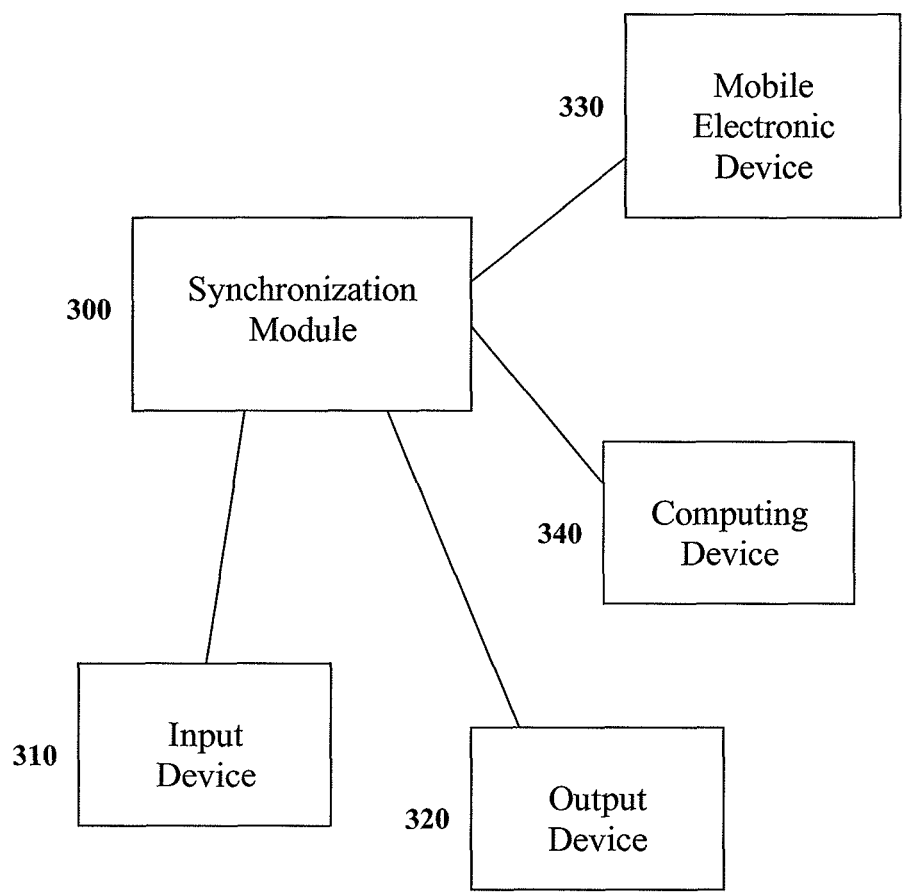
FIG. 3 illustrates a system for synchronization of a mobile electronic device with a computing device according to embodiments of the present technology.

According to embodiments of the present technology, as illustrated in FIG. 3, there is provided a system configured to synchronize a mobile electronic device 330 with a computing device 340. The system comprises a synchronization module 300 at least in part operative on the computing device 340. The synchronization module 300 is configured to scan the mobile electronic device 330 and determine if one or more pieces of data require synchronization. The synchronization module may further be configured to determine aspects associated with the communication link between mobile electronic device 330 and computing device 340, such as link type, speed, available bandwidth, link reliability, or the like. The synchronization module is further configured to determine one or more options, wherein each option defines a synchronizing sequence. An output device 320 operatively coupled to the synchronization module 300 is configured to present the one or more options to a user for selection. An input device 310 operatively coupled to the synchronization module 300 is configured to receive an input from the user, wherein the input is indicative of the selected synchronizing sequence. The synchronizing module is further configured to perform the synchronization between the mobile electronic device and the computing device based on the selected synchronization sequence, and in some embodiments to monitor progress of the synchronization and present output indicative thereof via the output device 320.

According to some embodiments of the present technology, the synchronization module is configured to substantially optimize the output information for presentation to a user, for example configuring the output for a particular screen size, resolution or the like, which may include scaling of images, transcoding of video, or the like. The synchronization module may transform data being transferred to the mobile electronic device into a form appropriate for use thereon.

According to some embodiments, the synchronization module is configured to scan for the one or more pieces of data using one or more data efficient methods or algorithms, for example analysis of checksums, file sizes, log files, metadata such as tags or data modification dates, or other method as would be readily understood. By employing these types of data efficient algorithms, the synchronization module can reduce initialization time for the synchronization process. According to some embodiments of the present technology, by using one or more data efficient methods or algorithms, correlation between one or more pieces of data that may be located on the computing device with one or more pieces of data previously transcoded and synchronized on the mobile electronic device can be enabled, thereby providing a means for limiting duplicate copying of one or more pieces of data between the computing device and the mobile electronic device.

According to some embodiments, the synchronization module is configured as a single inclusive module, wherein the format of the synchronization module is capable of synchronizing a plurality of types of data, for example photo data, PIM data, application data, music data and the like, and thus is independent of the mobile electronic device for which it is to perform synchronization. For example, this inclusive synchronization module will not be dependent on the types of data that a the mobile electronic device is capable of containing.

Figure 4:
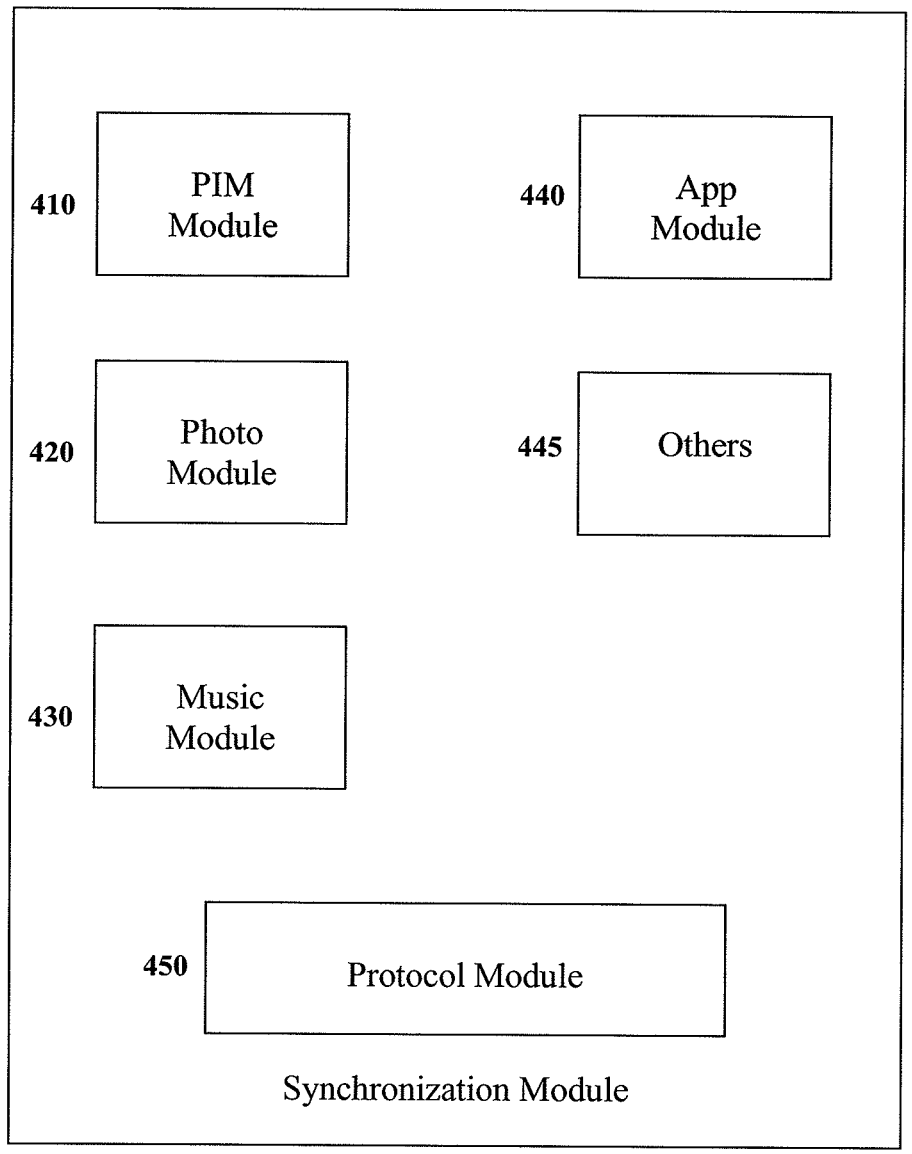
FIG. 4 is a schematic depiction of a synchronization module according to embodiments of the present technology.

In some embodiments of the present technology, the synchronization module is configured in a modular fashion, for example as illustrated in FIG. 4. For example, the synchronization module comprises a protocol module 450, which comprises a set of instructions that provide the general functionality of the synchronization module. A plurality of separate data dependent modules can be operatively coupled to the protocol module, each data dependent module providing a further set of instructions for the operation of the synchronization module. A further set of instructions of a data dependent module pertains to operations specific to types of data that the data dependent module is configured to aid with synchronization.

For example, as illustrated in FIG. 4, there can be a PIM module 410, photo module 420, music module 430, application module 440 and one or more other modules 445. Each of these data dependent modules are configured to perform the specific functions of the synchronization module as it pertains to the data type for which the data dependent module is configured.

For example, a music module can be configured to scan a mobile device for unsynchronized music data, determine which music data is to be synchronized and determine one or more options for presentation to a user. In this example, the music module can be configured to generate the one or more options at least in part based on the known organization pattern used for music, for example by genre, artist, title, song duration, album, play frequency, and the like.

In some embodiments of the present technology, during initial setup of a synchronization module for the synchronization of a mobile electronic device and a computing device, only the data dependent modules compatible with the mobile electronic device or computing device or both can be installed or uploaded. In this manner, the memory that is used for the storage of the synchronization module does not include information relating to data dependent modules that would not be used during the synchronization process, thereby saving memory space.

Implementations of the present technology will now be further explained with regard to the example scenarios. It should be expressly understood that these scenarios are only examples and are provided solely for the purposes of illustrating how the technology works in certain circumstances. Accordingly, these examples should not be construed as limiting any of the aspects of the technology already described above and claimed in the appended claims.

Consider first the example scenario depicted schematically with reference to FIGS. 5 to 8.

Figure 5:
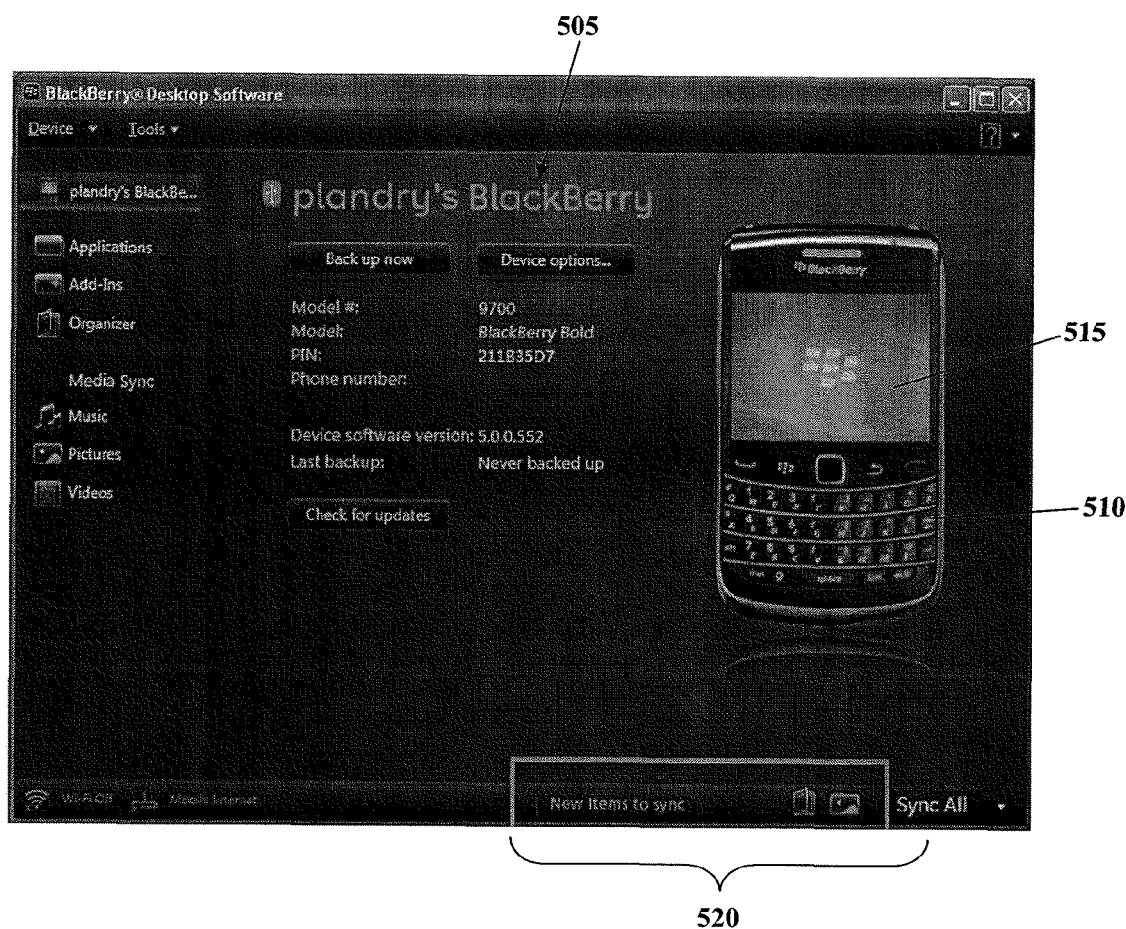
FIG. 5 is a screen capture of step(s) of a method for synchronizing a mobile electronic device with a computing device according to embodiments of the present technology.

FIG. 5 illustrates a screen capture of an output device during initiation of a synchronization process according to an embodiment of the present technology. As can be seen from this figure, the synchronization module has captured identification information 505 relating to the mobile electronic device to be synchronized. In addition, a picture representation of the type of device 510 is also illustrated to facilitate verification of the mobile electronic device to be synchronized. In some embodiments of the present technology, the picture representation of the device also includes a representation of the home page or wall paper 515 of the mobile electronic device, wherein this information can also be captured by the synchronization module. At the bottom of the screen of the output device there is visually presented that there are "new items to sync" and associated activation buttons 520.

Figure 6:
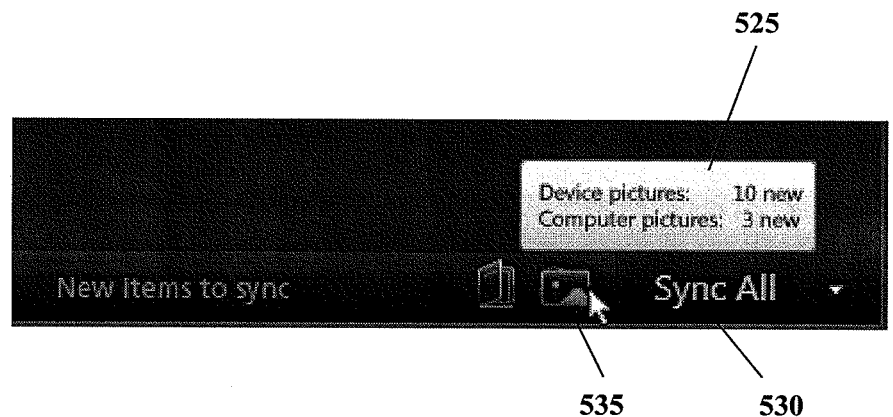
FIG. 6 is a close-up of a portion of the screen capture illustrated in FIG. 5.
Figure 7:
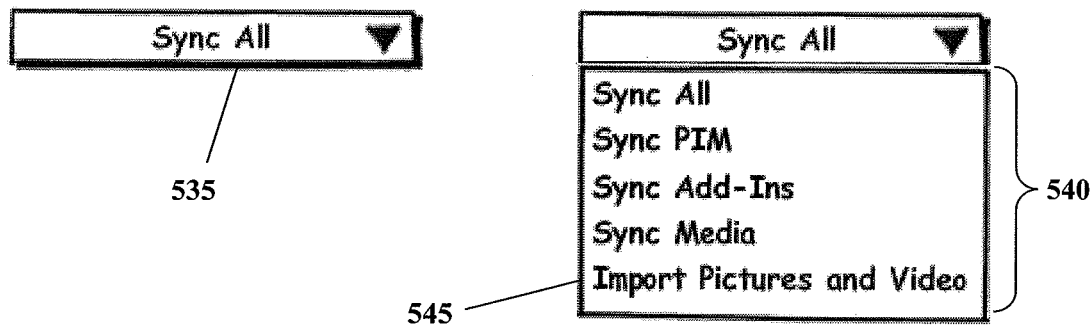
FIG. 7 illustrates notifications that are presented during a selection process, according to embodiments of the present technology.
Figure 8:
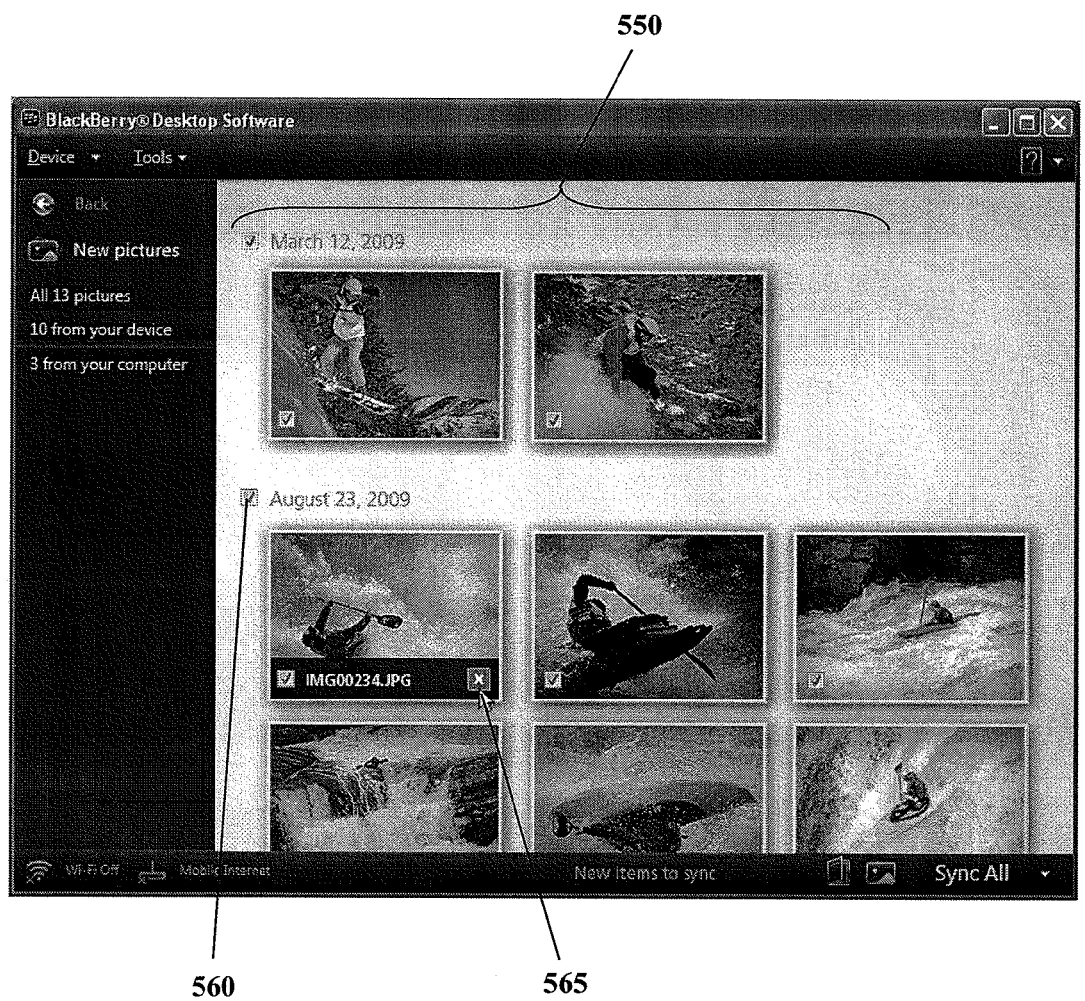
FIG. 8 is a screen capture of step(s) of a method for synchronizing a mobile electronic device with a computing device according to embodiments of the present technology.

FIG. 6 illustrates a close up view of the "new items to sync" indication and associated activation buttons illustrated in FIG. 5. By pointing towards select button 535, for example via mouseover or other selection action of an input device, a notification box 525 is presented which further defines the types of data that is to be synchronized. Upon selection of the button Synch All 530 as illustrated in FIG. 6 and FIG. 7, a further notification box is presented which defines the possible options 540 for selection which would result in the synchronization of the selected pieces of data. By the selection of option Import Pictures and Video 545 a further screen illustrating the pictures that require synchronization 550 are presented, as shown in FIG. 8. As illustrated each of the pictures originally has a check mark 555 associated therewith, which can imply that all pictures are to be synchronized. By selecting a particular picture a de-selection indicator 565 can be presented, which can enable that picture to be unselected for synchronization. In addition, selection of the desired picture may also be done on a date basis, for example by un-checking box 560 all pictures for Aug. 23, 2009 may be de-selected for synchronization. Upon finalization of the selection process, those pieces of data that are selected for synchronization are synchronized between the mobile electronic device and the computing device by the synchronization module.

As would be readily understood, the manner in which selection or de-selection or both, of the one or more pieces of data is performed can be varied in many ways and is considered to be within the scope of the instant technology. Selection or de-selection or both may be performed on an item-by-item basis, in bulk, or a combination thereof. In some embodiments, a multi-level, expandable and interactive menu may be presented to a user for selecting data at a desired level of specificity. A user may select data based on coarse categories, or expand a coarse category into finer categories, one or more of which may be selected. Multiple levels of categories may be provided, allowing a user to drill down to individual files for selection if desired.

Figure 9:
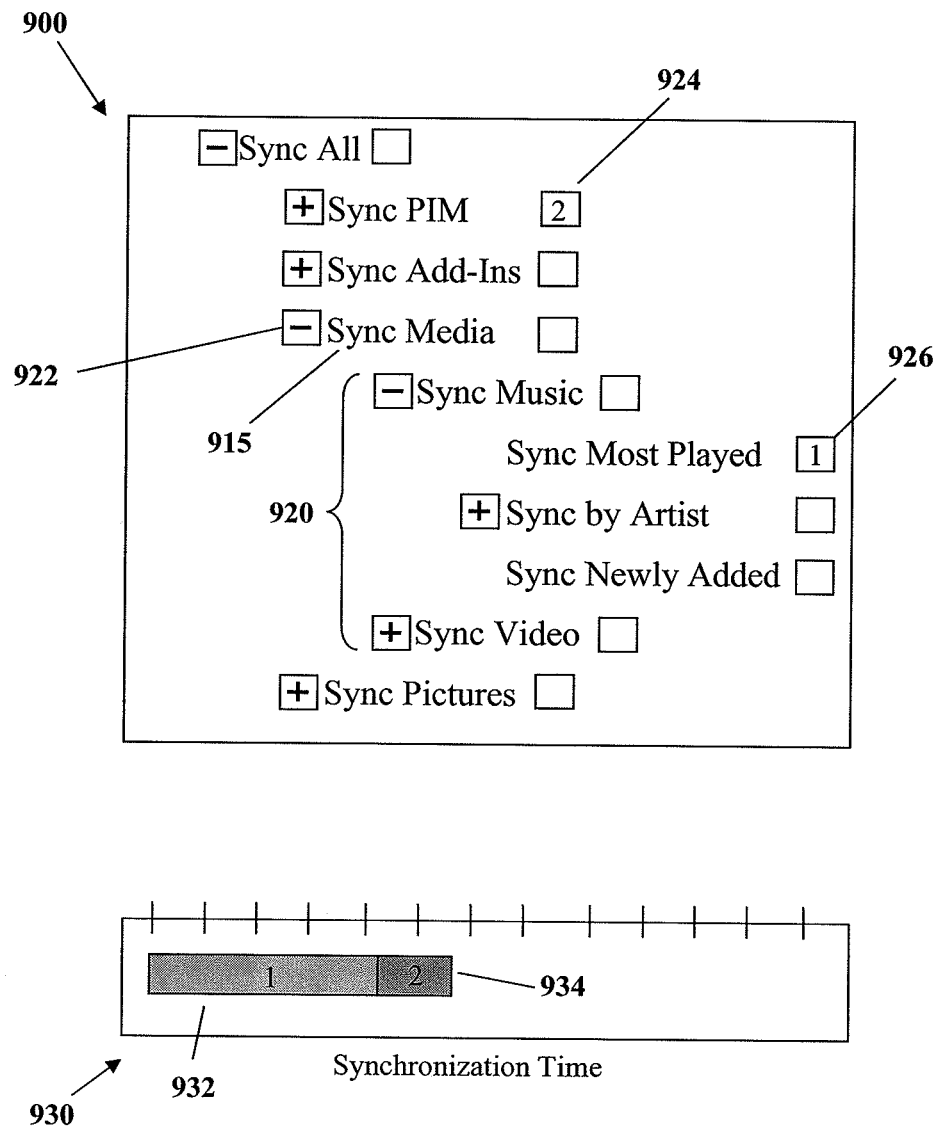
FIG. 9 illustrates a configurable and expandable menu presented during a selection process, according to embodiments of the present technology.

FIG. 9 illustrates a configurable and expandable menu 900 presented during a selection process, according to embodiments of the present technology. It should be noted that the mode of user interface of the present technology is not limited to drop down or pop-up menus, but rather other modes of displaying information to and receiving input from a user may be used as would be readily understood by a worker skilled in the art. The menu 900 comprises a plurality of nested menu items, thereby facilitating selecting synchronization options at a plurality of levels of specificity. Higher level menu items are expandable or collapsible by user action to reveal or hide lower level menu item. For example, the "synchronize media" item 915, can be expanded to reveal sub-items 920 by toggling expansion box 922, for example by mouse click. User selection of items to be synchronized may proceed by navigating to menu items and selecting them for example using selection boxes such as boxes 924 and 926. The selection boxes may be check boxes, or may be assigned a numerical value corresponding to a desired priority for menu items. In the present example, selection box 926 has been assigned "priority 1" and selection box 924 has been assigned "priority 2." In some embodiments, if a higher level item is selected, all of the sub-items under that item are also selected. Sub-items may be predetermined categories, directories, files, groups of files, or the like.

In some embodiments, the menu 900 may be configured based on factors such as files which require synchronization, aspects of the operative coupling between computing device and mobile electronics device, such as link effective speed, and the like. Selection of items to appear in the menu 900, order of the selected items, position in the hierarchy, and the like, may be performed based on such factors. For example, when total synchronization can be performed via the available operative coupling in less than a predetermined threshold amount of time, the menu 900 can be configured so that a "synchronize all" option may be easily selected, whereas when total synchronization is estimated to take longer than the predetermined threshold, the menu 900 can be configured to facilitate faster selection and prioritization of items to synchronize. In some embodiments, when a higher level item is expanded, the mobile electronics device, or the computing device, or both, are re-scanned, for example in an iterative process, to determine which sub-items to display under the expanded item, in what order they are to be displayed, or at least a portion of the hierarchy of the sub-items, sub-sub-items, etc.

FIG. 9 also illustrates a graphical representation 930 of the estimated time to perform the synchronization with the current user-defined options. As illustrated, the estimate includes sub-estimates 932 and 934 for synchronizing "priority 1" and "priority 2" items, respectively.

Figure 10:
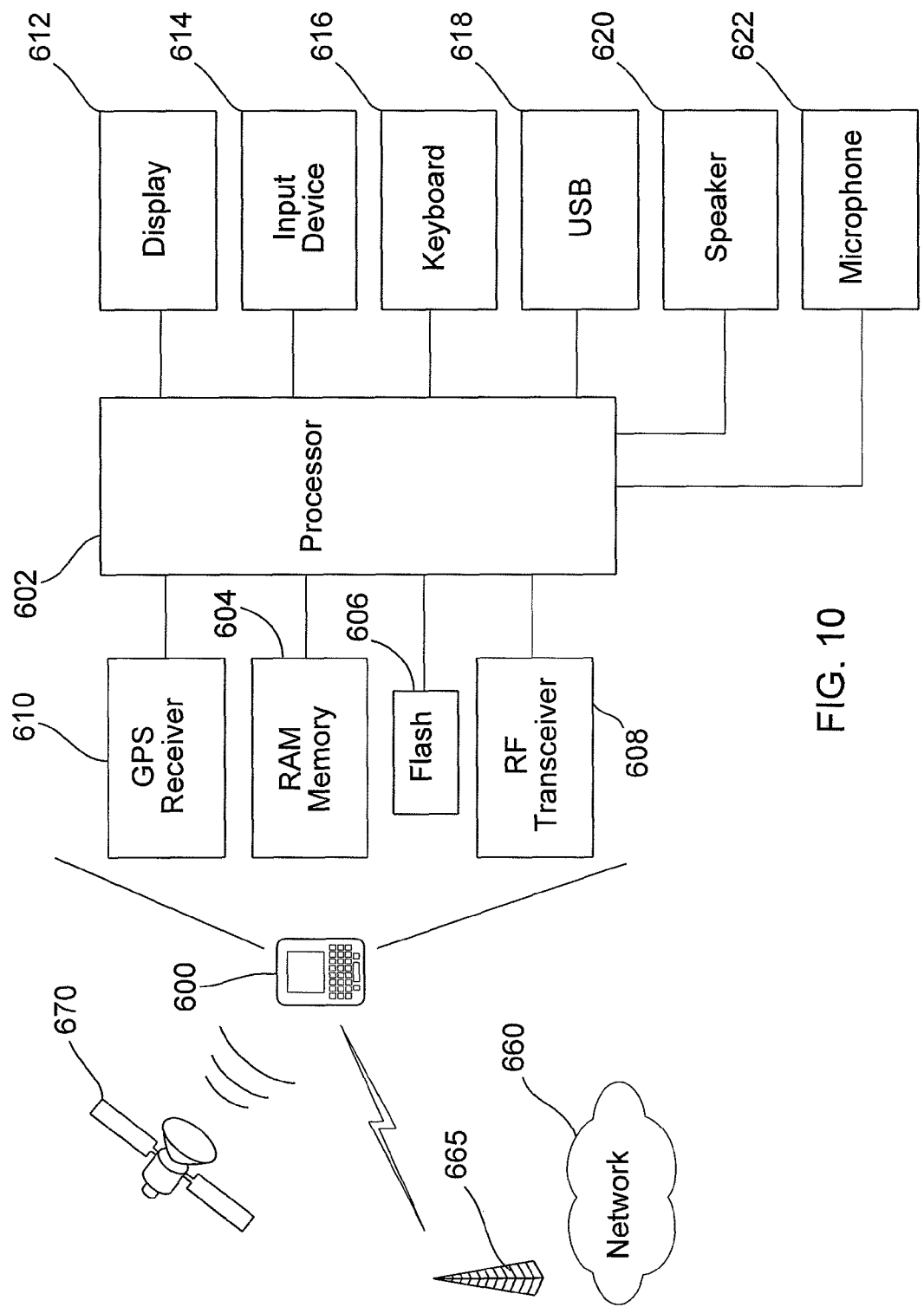
FIG. 10 illustrates a block diagram of an exemplary wireless communication device.

FIG. 10 is a block diagram depicting certain main components of an exemplary wireless communication device 600. It should be understood that this figure is intentionally simplified to show only certain components; the device 600 may include other components beyond those shown in FIG. 2. The device 600 includes a microprocessor 602 (or simply a "processor") which interacts with memory in the form of RAM 604 and flash memory 606 to enable a variety of device functions and to execute an operating system for running software applications loaded on the device. The device 600 includes a radiofrequency (RF) transceiver 608 for communicating wirelessly with a base station 665 of a wireless network 660, or alternatively or additionally for communicating directly with another peer device such as a wireless communication device, for example as may occur in some ad-hoc networks. The base station 665 may be a cellular base station, wireless access point, or the like. The base station 665 may change as the wireless communication device travels. The RF transceiver includes a wireless communication channel for transmitting and receiving data. The RF transceiver may further include a wireless voice channel for transmitting and receiving voice communications, for example concurrently with transmission and reception of data over the same or a separate logical or physical channel.

The device 600 optionally includes a GPS receiver chipset 610 for receiving GPS radio signals transmitted from one or more orbiting GPS satellites 670. The GPS receiver chipset 610 can be embedded within the device or externally connected, such as, for example, a "Bluetooth" GPS puck or dongle. Other positioning systems may also be used in place of GPS, as would be readily understood by a worker skilled in the art.

In terms of input/output devices or user interfaces (UI's), the device 600 typically includes a display 612 (e.g. a small LCD screen), a thumbwheel or trackball 614, a keyboard 616, which in some embodiments may be integrated or enabled using the display such as a touch screen display, a USB 618 or serial port for connecting to peripheral equipment, a speaker 620 and a microphone 622. The device's display 612 may optionally include a touch screen input device.

The wireless communication device 600 sends and receives communication signals via the RF transceiver 608. When communicating wirelessly with a base station 665 of a wireless network 660, the device 600 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi or WiMAX technologies, or other communication technologies and protocols as would readily be understood by a worker skilled in the art. In some embodiments, the wireless device 600 may be capable of operation using multiple protocols. The base station 665 may be part of a wireless network, such as a cellular network, local-area network, wide-area network, wireless hotspot network, or the like. The wireless communication device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

The device 600 may be operatively coupled to a computing device for synchronization via one or more available and substantially direct communication links. For example, the RF transceiver 608 may be configured for communication via one or more wireless protocols such as Bluetooth™, IEEE 802.11 or Wi-Fi™, Wireless USB, ZigBee™, or the like. The USB interface 618 may be additionally or alternatively used to provide a wired communication link. In some embodiments, a communication link may be established via a removable memory module such as a Secure Digital (SD™) card.

Figure 11:
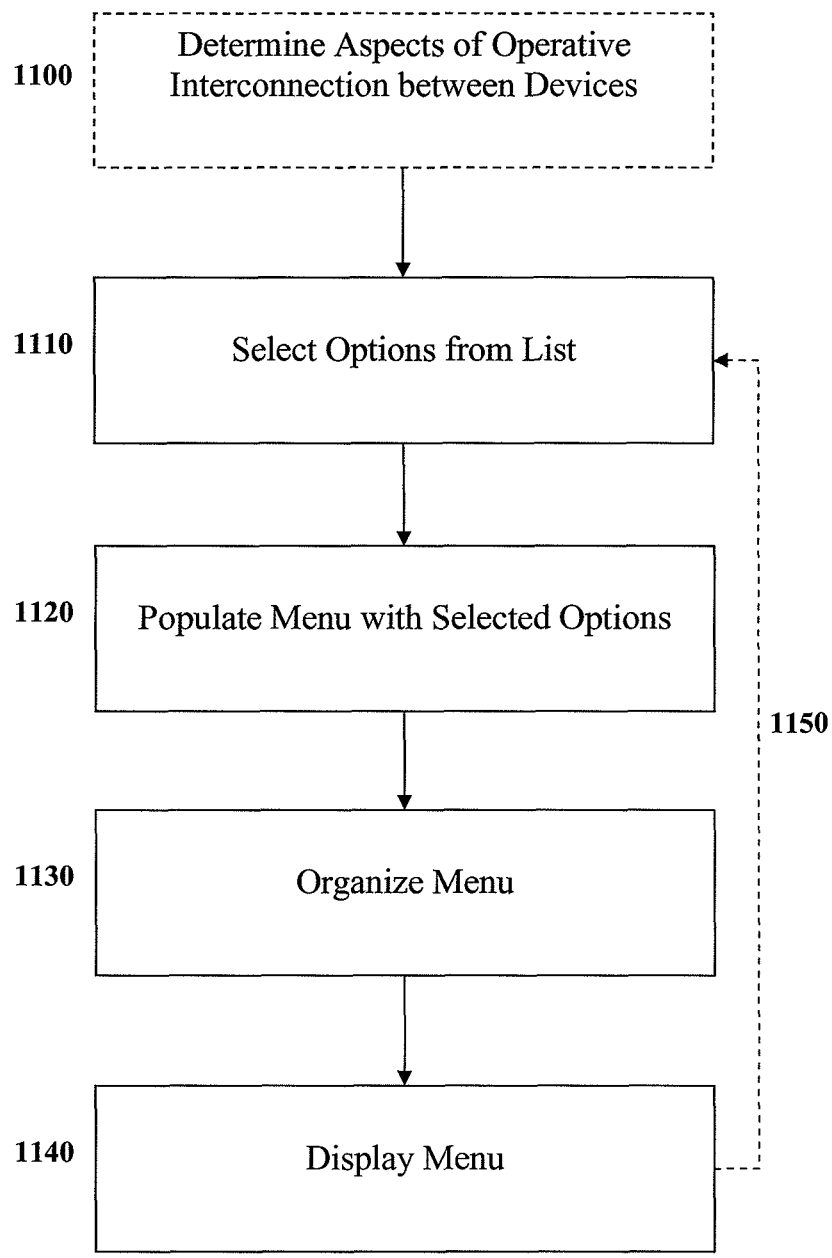
FIG. 11 illustrates a portion of a method for synchronizing a mobile electronic device with a computing device, according to embodiments of the present technology.

FIG. 11 illustrates a portion of a method for synchronizing a mobile electronic device with a computing device, according to embodiments of the present technology. The method optionally comprises determining 1100 aspects of an operative interconnection between mobile electronic device and computing device, for example connection type or types, link speed, effective speed, and the like. Options are selected 1110 from a list of potential options for presenting to a user in the form of an interactive menu, for example via a computing device or mobile electronic device output interface. Option selection 1110 may be based at least in part on the determined aspects, possibly along with other aspects such as which data requires synchronization. The menu is populated 1120 with the selected options and organized 1130, for example by placing options in an order from top to bottom, and grouping options hierarchically into options, sub-options, etc. Organization 1130 may be based at least in part on the determined aspects 1100. The interactive menu is then displayed to the user 1140. In some embodiments, upon user interaction 1150 with the menu, the menu may be iteratively reconfigured, for example by expanding sub-option groupings, reorganizing the menu, adding or subtracting options, or the like.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method comprising:
   scanning, using a synchronization module of a computing device, a mobile electronic device operatively coupled thereto to determine one or more pieces of data for synchronization;
   determining a link speed between the mobile electronic device and the synchronization module to obtain a time available for synchronization indicative of time allocated for completing synchronization;
   providing one or more options for selection, each option representing instructions to synchronize a respective subset of the one or more pieces of data, and based on the time available for synchronization and the link speed; when an estimated time for total synchronization exceeds the time available for synchronization, the one or more options are adjusted to facilitate prioritization and selection; and when the estimated time for the total synchronization is less than the time available for synchronization, the one or more options are adjusted to facilitate ease of total synchronization, each of the one or more options further representing a synchronization sequence indicative of an order in which elements of said respective subset of the one or more pieces of data are to be synchronized; and,
   synchronizing the mobile electronic device with the computing device based at least in part on a selected one of the one or more options.

2. The method according to claim 1, wherein the determining the link speed is based on one or more of: communication link type, communication link protocol, communication link overhead, communication link reliability, communication link uptime, communication link bandwidth, communication link delay, communication link error rate, communication link signal-to-noise ratio, communication link effective speed, estimated synchronization time, and synchronization time budget.

3. The method according to claim 1, wherein the providing the one or more options comprises selecting one or more options from a list of potential options, populating a menu with the selected one or more options, and organizing the menu in a selected manner.

4. The method according to claim 1, wherein the one or more options include options for specifying a prioritization of data items to be synchronized.

5. The method according to claim 1, wherein the options can be selected at a plurality of levels of specificity.

6. The method according to claim 1, wherein scanning the mobile device to determine the one or more pieces of data, and the providing the one or more options for selection proceed according to an iterative process.

7. The method according to claim 1, further comprising capturing one or more identification parameters of the mobile electronic device and presenting an indication of the one or more identification parameters.

8. The method according to claim 1, wherein an increasing number of the one or more options are provided for selection as the expected amount of time available for synchronization decreases relative to an estimated time required to synchronize all of the one or more pieces of data requiring synchronization.

9. A system for synchronizing a mobile electronic device with a computing device, the system comprising:
a synchronization module at least in part operative on the computing device, the synchronization module configured to: scan the mobile electronic device to determine one or more pieces of data for synchronization; determine a link speed between the mobile electronic device and the computing device to obtain a time available for synchronization indicative of time allocated for completing synchronization; and determine one or more options for selection, each option representing instructions to synchronize a respective subset of the one or more pieces of data, and based on the time available for synchronization and the link speed; when an estimated time for total synchronization exceeds the time available for synchronization, the one or more options are adjusted to facilitate prioritization and selection, each of the one or more options further representing a synchronization sequence indicative of an order in which elements of said respective subset of the one or more pieces of data are to be synchronized; and when the estimated time for the total synchronization is less than the time available for synchronization, the one or more options are adjusted to facilitate ease of total synchronization;
an output device operatively coupled to the synchronization module, the output device configured to provide the one or more options; and
an input device operatively coupled to the synchronization module, the input device configured to receive an option selection;
wherein the synchronization module is further configured to synchronize the mobile electronic device with the computing device at least in part based on the option selection.

10. The system according to claim 9, wherein the synchronization module comprises a protocol module and one or more separate data dependent modules.

11. The system according to claim 9, wherein the link speed is determined based on one or more of: communication link type, communication link protocol, communication link overhead, communication link reliability, communication link uptime, communication link bandwidth, communication link delay, communication link error rate, communication link signal-to-noise ratio, communication link effective speed, estimated synchronization time, and synchronization time budget.

12. The system according to claim 9, wherein the one or more options are selected from a list of potential options, and a menu is populated with the selected one or more options, and the menu organized in a selected manner.

13. The system according to claim 9, wherein the one or more options include options for specifying a prioritization of data items to be synchronized.

14. The system according to claim 9, wherein the one or more options can be selected at a plurality of levels of specificity.

15. The system according to claim 9, wherein scanning the mobile device to determine the one or more pieces of data, and providing the one or more options proceed according to an iterative process.

16. The system according to claim 9, wherein the synchronization module is further configured to capture one or more identification parameters of the mobile electronic device, and the output device further configured to present an indication of the one or more identification parameters.

17. The system according to claim 9, wherein an increasing number of the one or more options are provided for selection as the expected amount of time available for synchronization decreases relative to an estimated time required to synchronize all of the one or more pieces of data requiring synchronization.

18. A non-transitory computer-readable medium storing a computer program, wherein execution of the computer program is for:
scanning, using a synchronization module of a computing device, a mobile electronic device operatively coupled thereto to determine one or more pieces of data for synchronization;
determining a link speed between the mobile electronic device and the synchronization module to obtain a time available for synchronization indicative of time allocated for completing synchronization;
providing one or more options for selection, each option representing instructions to synchronize a respective subset of the one or more pieces of data, and based on the time available for synchronization and the link speed; when an estimated time for total synchronization exceeds the time available for synchronization, the one or more options are adjusted to facilitate prioritization and selection; and when the estimated time for the total synchronization is less than the time available for synchronization, the one or more options are adjusted to facilitate ease of total synchronization, each of the one or more options further representing a synchronization sequence indicative of an order in which elements of said respective subset of the one or more pieces of data are to be synchronized; and, synchronizing the mobile electronic device with the computing device based at least in part on a selected one of the one or more options.

* * * * *